United States Patent
Guenther

(10) Patent No.: US 6,199,886 B1
(45) Date of Patent: Mar. 13, 2001

(54) REAR SUSPENSION SYSTEM FOR BICYCLE

(76) Inventor: Peter Guenther, 9 Vickecry Street, Cook ACT 2614 (AU)

( * ) Notice: Subject to any disclaimer, the term of this patent is extended or adjusted under 35 U.S.C. 154(b) by 0 days.

(21) Appl. No.: 09/627,674

(22) Filed: Jul. 28, 2000

Related U.S. Application Data

(63) Continuation of application No. 09/037,940, filed on Mar. 10, 1998, now abandoned.

(30) Foreign Application Priority Data

Mar. 14, 1997 (AU) .............................................. PO5679/97

(51) Int. Cl.[7] ...................................................... B62K 1/00
(52) U.S. Cl. .............................................................. 280/284
(58) Field of Search ................................... 280/245, 284, 280/288, 285, 286

(56) References Cited

U.S. PATENT DOCUMENTS

| | | |
|---|---|---|
| 642,238 | 1/1900 | Manning . |
| 953,697 | 4/1910 | Kuebodeaux . |
| 1,047,430 | 12/1912 | Michaelson . |
| 1,405,982 | 2/1922 | Drum et al. . |
| 2,976,056 | 3/1961 | Henry . |
| 5,409,249 | 4/1995 | Busby . |

FOREIGN PATENT DOCUMENTS

| | | |
|---|---|---|
| 986467 | 5/1954 | (FR) . |
| 27980 | 10/1912 | (GB) . |
| 18770 | 12/1914 | (GB) . |
| 9313974 | 7/1993 | (WO) . |

*Primary Examiner*—Kevin Hurley
*Assistant Examiner*—Andrew J. Fischer
(74) *Attorney, Agent, or Firm*—Saliwanchik, Lloyd & Saliwanchik

(57) ABSTRACT

A rear suspension system for a bicycle is disclosed. The system includes a link member (30) and chain stay (20) each pivotably mounted to the sprung mass. The seat stay (18) mounts the rear axle (22) and is pivotably mounted at its upper end to link member (30) and is pivotably mounted at a point intermediate its length to chain stay (20).

3 Claims, 3 Drawing Sheets

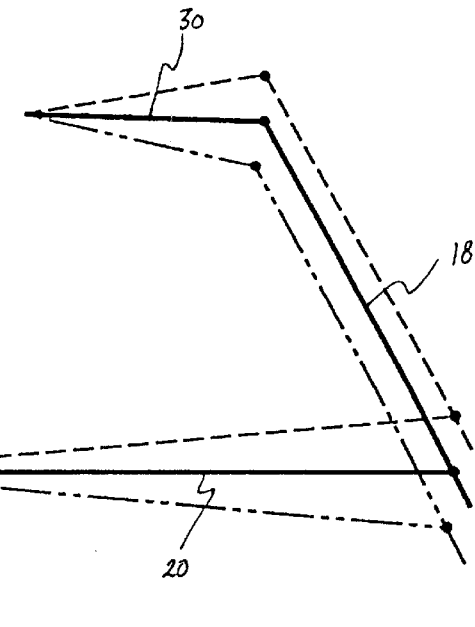
*Fig. 12A.*
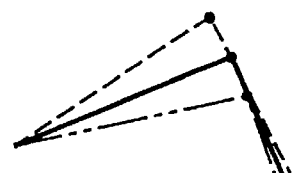
*Fig. 12B.*
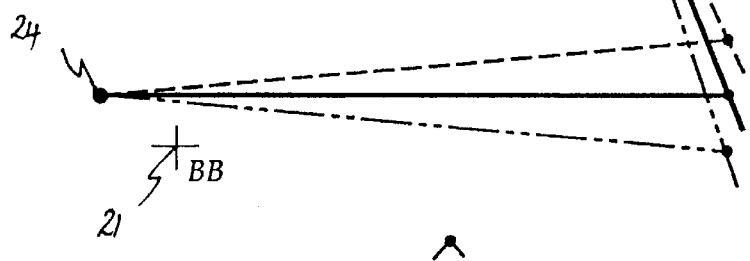
*Fig. 12C.*
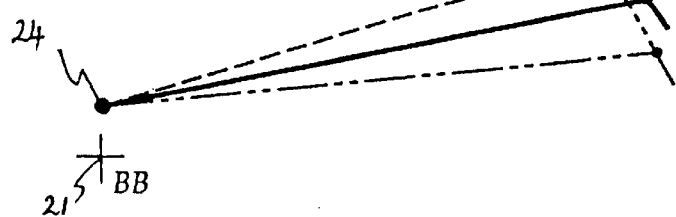

REAR SUSPENSION SYSTEM FOR BICYCLE

CROSS-REFERENCE TO A RELATED APPLICATION

This application is a continuation of application Ser. No. 09/037,940, filed Mar. 10, 1998.

TECHNICAL FIELD

This invention relates to a rear suspension system for a bicycle.

BACKGROUND ART

The two primary functions of a rear suspension system in a bicycle are to maintain tire contact with the ground during bumps and depressions and to isolate shock and vibration from the rider.

Many different rear suspension systems are presently on the market. Known systems include the high pivot design, low/forward pivot design, bottom bracket pivot design, unified rear triangle design and numerous multi-link designs.

A problem that all rear suspension designers have to address is the elimination of undesirable effects associated with rear suspension including those which have been loosely referred to by cyclists as "bio-pacing".

In recent times there has been an attempt to quantify "bio-pacing" in terms of neutrality (N-factor) and pedal feedback (P-factor). Both factors are functions of suspension geometry and also vary with gear selection. When a cyclist refers to "bio-pacing" they are usually referring to pedal feedback or P-factor.

N-factor is the tendency of the suspension to be extended or compressed by pedaling forces which are pulse-like in nature. Regardless of whether the suspension is compressed or extended by pedaling forces, this is wasted energy which causes the sprung mass to bob up or down with each pedal stroke.

A positive N-factor causes the suspension to extend under pedaling forces whilst a negative N-factor causes the suspension to compress under pedaling forces.

Whilst neither a positive N-factor or negative N-factor is desirable, a positive N-factor is believed to have some advantage during climbing due to the fact that the extension of the suspension tends to urge the tire into engagement with the ground as power is applied thereby improving traction during power application.

A positive N-factor also tends to make the suspension less active ie. if a bump is struck by the rear wheel during the application of power, the positive N-factor will tend to resist the compression of the suspension which would otherwise occur to absorb the bump. A very positive N-factor may result in the suspension "locking out" or "topping out" in which case the suspension may be totally inactive and will also be unable to extend further to follow depressions.

A negative N-factor, as explained above, means that the suspension is compressed by pedaling forces. This tendency is accentuated during out-of-the-saddle pedaling because the rider's tends to "bounce" on the bike and the downward weight is applied simultaneously with the pedaling force, both of which compress the suspension. When the suspension is compressed it tends to be stiffer and further suspension travel is limited thereby inhibiting the suspension's compliance to bumps.

P-factor is the tendency for the length of the top run of chain extending tangentially between the gear and chainring to vary during suspension action. This variation manifests itself in a forward or backward rotation of the pedals whilst the pedals are stationary, or in a speeding up or slowing down of the pedal rotation during actual pedaling.

If, due to geometry, the rear axle moves away from the bottom bracket during compression of the suspension, then the length of chain extending tangentially between the gear and chainring must increase and this increase will be compensated for by a rearward rotation or slowing of the pedals (positive P-factor). Of course, the pedals will then rotate forwardly or speed up when the suspension returns to its uncompressed state.

Conversely, if the rear axle approaches the bottom bracket during compression of the suspension, then the length of chain extending tangentially between the gear and chainring must decrease and this decrease will be compensated for by a forward rotation or speeding up of the pedals (negative P-factor). The pedals will then slow or rotate rear-hardly as the suspension returns to its uncompressed state.

A further factor which influences the variation of the length of chain extending tangentially between the gear and chainring (and hence pedal feedback or P-factor) is the relative sizes of the gear and chainring. In this regard, as the suspension compresses the chain tends to wind onto the gear and tends to wind off of the chainring. Due to the fact that the chainring is usually larger in diameter than the gear, a greater length of chain winds off the chainring than onto the gear and therefore the pedals must rotate forwardly to absorb the slack ie. there is a small negative P-factor effect caused by the winding/unwinding effect. This winding/unwinding effect differs in magnitude with different gear selections.

The unified rear triangle (URT) design referred to above has eliminated P-factor by combining the rear axle and bottom bracket in a single rigid unit. Thus, there is no variation of the dimension between the bottom bracket and rear axle and there is no winding/unwinding effect. For this reason the URT design is presently popular. The URT design, however, has new problems such as, for example, the fact that the distance between the bottom bracket and saddle is variable and this presents biomechanical difficulties.

The present invention provides an alternative rear suspension system which ameliorates P-factor. The present invention also provides a system in which N-factor may be simultaneously controlled.

DISCLOSURE OF INVENTION

This invention in one aspect resides in a rear suspension system for a bicycle including:
- a chain stay pivotably mounted to the sprung mass;
- a link member pivotally mounted to the sprung mass;
- a seatstay mounting the rear axle at its lower end, pivotally mounted to the link member at its upper end, and pivotally mounted to the chain stay at a point intermediate the upper and lower ends of the seat stay.

Preferably, during suspension action, the rear axle follows an approximate arc centred on the bottom bracket. Most preferably, the radius of the arc increases by an amount to offset the winding/unwinding effect of an "average" gear.

Preferably, the link member and chain stay define an angle of approximately 90 degrees when the suspension is loaded with the rider's weight.

BRIEF DESCRIPTION OF DRAWINGS

In order that this invention may be more easily understood and put into practical effect, reference will now be made to the accompanying drawings, wherein:

FIG. 12 is a series of three views showing the locus of the rear axle for three different suspension geometries.

BEST MODE

Figure 1:
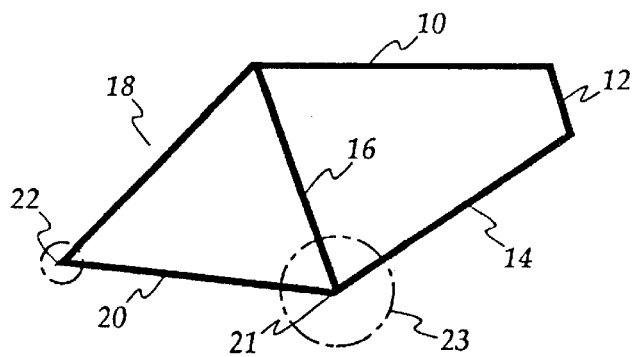
FIG. 1 is a schematic drawing of a non-suspension frame.

Referring firstly to FIG. 1, there is illustrated a conventional frame for the purpose of establishing nomenclature.

A conventional frame consists of a top tube 10, head tube 12, down tube 14, seat tube 16, seat stays 18 and chain stays 20.

The rearward ends of the chain stays include drop outs for accomodating the rear wheel axle 22.

The intersection of the seat tube 16, down tube 14 and chain stays 20 defines the bottom bracket 21 which accomodates the pedal axle to which the pedals and chainrings 23 are mounted.

THE HIGH PIVOT DESIGN

Figure 2:
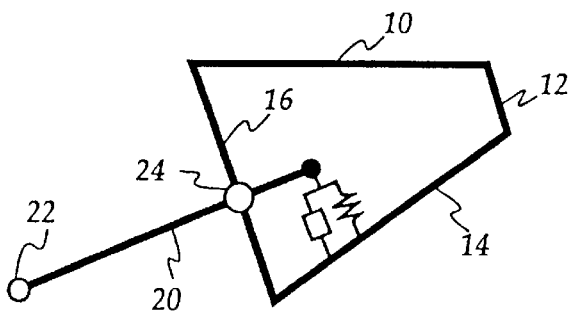
FIG. 2 is a schematic drawing of a high pivot design according to the prior art.

In FIG. 2 there is shown a high pivot design in which the chain stays 20 are pivotably mounted to the seat tube 16 at a point 24 well above the bottom bracket. As can be seen the seat stays 18 have been eliminated and, in this particular example, the spring/damper is mounted between the down tube and the forward end of the chain stays.

Figure 3:
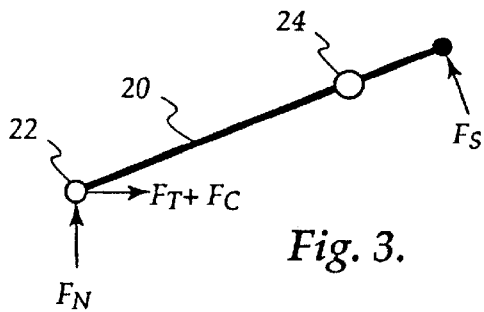
FIG. 3 is a free body diagram of the chain stay of a high pivot design.

Referring to FIG. 3 there is shown a free body diagram of the chain stay 20 of the high pivot design.

With a rider sitting on the bike but not pedaling, the suspension adopts an equilibrium "sag" position in which the total moment about the pivot point 24 is zero, ie. the clockwise moment generated by the normal force ($F_N$) at the rear axle 22 is balanced by the anti-clockwise moment generated by the spring force ($F_S$) at the forward end of the chain stays. When not pedaling the chain force ($F_C$) and traction force ($F_T$) are zero.

When pedaling occurs this equilibrium of moments is upset by newly introduced moments on the chainstay 20.

It should be firstly understood that the decelerating forces on a cyclist are constant for a given speed and incline. These decelarating forces are drag which acts at the rider/bike centre of area, and gravity which acts at the rider/bike centre of gravity.

In contrast the accelerating force is pulse-like and acts at the interface between the rear tire and ground, ie. the traction force. The centre of the rider/bike mass is about 1 meter off the ground and therefore a pulsing couple or torque is produced which causes a pulsing weight transfer to the rear wheel. This traction induced couple is exactly what causes a bike to "wheelie" if excessive traction force is generated.

In the present case the weight transfer to the rear wheel is important as the resultant normal force must increase in magnitude hence increasing the clockwise moment about pivot point 24.

Another newly introduced force is the horizontal traction force itself which is applied to the chain stay 20 at rear axle 22. In the case of the high pivot design shown in FIG. 3, a forwardly directed horizontal force at rear axle 22 will generate an anticlockwise moment about pivot 24.

Another newly introduced force is the chain force (shown as being horizontal in this instance) which is also applied to the rear axle.

Figure 4:
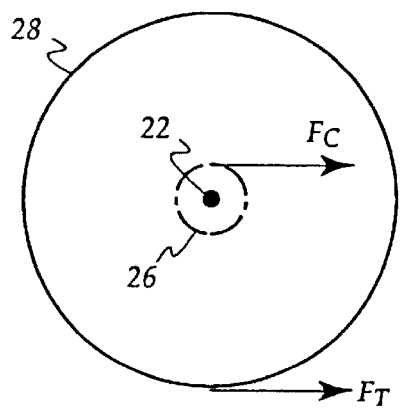
FIG. 4 is a schematic drawing of a rear wheel.

Referring to FIG. 4, it will be noted that the clockwise moment on wheel 28 is generated by the chain force acting on the gear 26 whilst the anticlockwise moment is generated by the traction force acting at the tire/ground interface. Both the traction force and chain force are forwardly directed and must be resisted by the chain stay. Hence the chain force also acts on the chain stay and generates an anticlockwise moment.

In summary, when compared to the non-pedalling equilibrium, pedaling introduces a pulsing clockwise moment to the chainstay due to the weight transfer to the rear wheel and the resultant increase in the normal force, and also introduces a pulsing anticlockwise moment to the chainstay due to the introduction of the traction force and chain force.

In the case of a high pivot design, the anticlockwise moment generated by the traction force and chain force significantly exceeds the clockwise moment generated by the increased normal force and the chain stay pivots in an anticlockwise direction resulting in an extension of the suspension (and a reduced spring force). Of course, the pivoting movement of the chain stay is resisted by the damper.

It should also be noted that, in response to compression of the suspension, the distance between the bottom bracket and rear axle increases thereby increasing the length of the top run of chain extending tangentially between the chainring and gear. This causes a rearward rotation or slowing of the pedals, ie. positive P-factor.

In conclusion, the high pivot design exhibits a strongly positive N-factor and a strongly positive P-factor.

THE LOW/FORWARD PIVOT DESIGN

Figure 5:
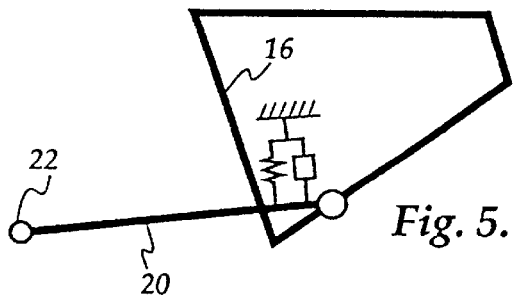
FIG. 5 is a schematic drawing of a low/forward pivot design according to the prior art.
Figure 6:
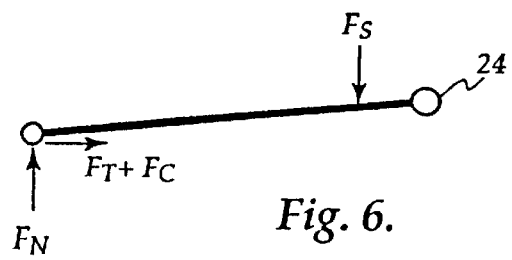
FIG. 6 is a free body diagram of the chain stay of a low/forward pivot design.

Referring now to FIG. 5, there is shown a low/forward pivot design in which the chain stays 20 are pivotably mounted at a point slightly ahead of and above of the bottom bracket (shown in this case as being on the down tube).

As previously, in the absence of pedaling, the clockwise moment of the normal force about the pivot point is balanced by the anticlockwise moment of the spring force about the pivot point.

During pedaling, the normal force increases due to rearward weight transfer thereby increasing the magnitude of the clockwise moment. The traction force generates an anticlockwise moment.

Whilst the chain force has thus far been shown as being horizontal it may, in fact, vary from the horizontal depending on chainring and gear selection. In one chainring and gear selection the chain force may be horizontal in which case it will generate an anticlockwise moment as per the traction force. However, in another chainring and gear selection it may be inclined above the horizontal so that the line of chain force passes above the pivot point and therefore generates a clockwise moment.

It should be noted that most mountain bikes have three chainrings. Thus, whilst the line of chain force may pass directly through the pivot point when in one chainring (usually the middle chainring), there will be a slight lever arm and hence moment when in the other chainrings. If the N-factor is neutral when in the middle chainring (ie. the clockwise moment from the normal force cancels the anticlockwise moment from the traction force), then the N-factor will be slighly negative when in the big chainring and slightly positive when in the small chainring.

It will also be noted with the low/forward pivot design that, as the suspension is compressed, the rear axle moves seperates slightly from the bottom bracket. This movement means that the distance between the rear axle and bottom bracket increases and the pedals must rotate rearwardly to provide the additional length of chain required to tangentially span the gear and chainring.

In conclusion, a good low/forward pivot design has a variable but substantially neutral N-factor and a slightly positive P-factor.

THE BOTTOM BRACKET DESIGN

Figure 7:
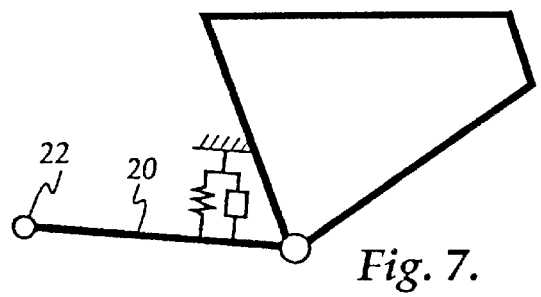
FIG. 7 is a schematic drawing of a bottom bracket pivot design according to the prior art.

Referring now to FIG. 7, there is shown a bottom bracket pivot design in which the chain stays are pivotably mounted at a point coincident with or immediately behind the bottom bracket.

Figure 8:
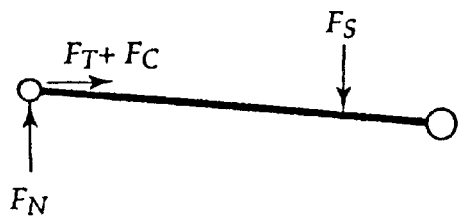
FIG. 8 is a free body diagram of the chain stay of a bottom bracket design.

Referring to FIG. 8, it will be noted that the increase in the normal force generates a clockwise moment about the pivot. The traction force tends to be directed through or slightly above the pivot point and therefore generates no moment or a small clockwise moment. The chain force, depending on gear selection tends to generate a clockwise moment. Accordingly, the bottom bracket pivot design has a strongly negative N-factor.

It will also be noted with the bottom bracket pivot design that, as the suspension is compressed, the rear axle and the bottom bracket stay a fixed distance apart.

The P-factor may, in fact, be slightly negative due to the winding/unwinding effect previously discussed.

In conclusion, the bottom bracket pivot design exhibits a strongly negative N-factor and a neutral or slightly negative P-factor.

THE UNIFIED REAR TRIANGLE DESIGN

Figure 9:
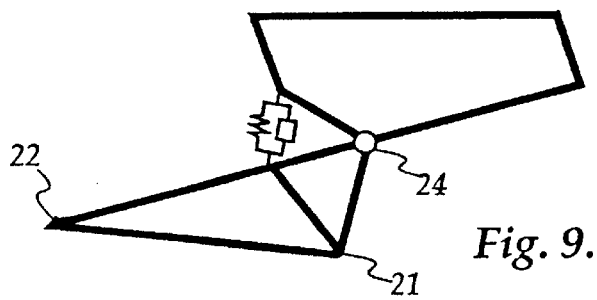
FIG. 9 is a schematic drawing of a unified rear triangle design according to the prior art.

Referring now to FIG. 9 there is illustrated another rear suspension design known as the Unified Rear Triangle (URT) design. In this case the bottom bracket and rear axle are integral and therefore P-factor has been neutralised. However, a problem with this design is that the bottom bracket, and hence pedals, are not suspended. Given, that the pedals is one of the three points of contact between the bike and rider, the fact that the pedals are not suspended means that a significant portion of the shock is transmitted to the rider, particularly when standing. Another problem with URT design is that the distance between the bottom bracket and saddle varies during suspension movement. There are concerns that this biomechanical inconsistency may leads to reduced power and/or knee injuries.

Also, the question of N-factor still has to be addressed. With the URT design, chain force does not generate a moment about the pivot point because the forward chain force at the rear axle is cancelled by the equal and opposite rearward chain force applied at the bottom bracket. However, the traction force and the increase in the normal force are still relevant. If the pivot point is low then a URT design will exhibit negative N-factor as per a bottom bracket pivot design. In contrast, if the pivot point is high then the N-factor is positive as per a high pivot design. Thus, by carefully selecting the position of the pivot point both N-factor and P-factor can be substantially neutralised in a good URT design. For this reason, the URT design is presently popular. However, the other problems introduced by this design still exist.

THE PRESENT DESIGN

Figure 10:
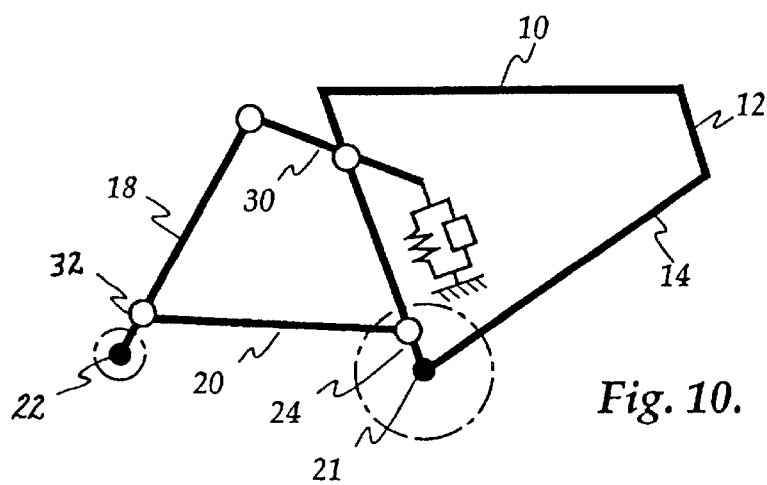
FIG. 10 is a schematic drawing of a rear suspension system according to the present invention.

Referring now to FIG. 10 there is schematically illustrated an alternative rear suspension system according to the present invention.

In the present invention the rear axle is mounted to the seat stay 18 which is pivotably mounted to the chain stay 20 at 32. This means that the variation in distance between the rear axle and the bottom bracket is a function of both the pivoting of the chain stay 20 about the main pivot 24 and the pivoting of the seat stay 18 relative to the chain stay 20 about pivot 32.

The geometry of chain stay 20, seat stay 18 and link 30 is chosen such that the distance between the rear axle 22 and bottom bracket 21 remains essentially constant as the suspension compresses or extends, ie rear axle 22 moves in an arc centred on bottom bracket 21. In fact, the distance between the rear axle and bottom bracket may increase slightly during suspension compression to offset the winding/unwinding effect.

The suspension illustrated in FIG. 10 has adopted its "sag" equilibrium position with the rider's weight present. It will be noted that, in the sag position, the angle defined between the seat stay 18 and link 30 is about 90 degrees.

Figure 11:
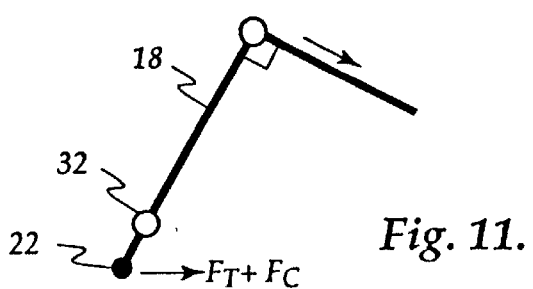
FIG. 11 is a free body diagram of the seat stay of FIG. 10.

The fact that the angle defined between the seat stay 18 and link 30 is about 90 degrees is important in achieving a neutral N-factor. In this regard, if the angle is significantly acute or obtuse then the forwardly directed chain force and traction force which is applied to the rear axle as shown in FIG. 11 would have the effect of pushing the rear axle 22 forward with the seat stay pivoting rearwardly about pivot 32 and pulling the top end of the seat stay 18 in a rearward direction. This rearward movement of the top end of the chain stay can only occur if the angle between the seat stay 18 and link 30 is significantly acute or obtuse. Because the angle is substantially 90 degrees in the sag position, the link does not pivot about pivot 34 but rather goes into tension and resists rotation of seat stay 18 about pivot 32 which might otherwise be induced if the angle was acute or obtuse.

As suspension compression occurs, pivot 32 will follow an upward arc centred on main pivot 24 and link 30 must rotate about its pivot 34. As a result, the top end of seat stay 18 is pulled forward and, due to the forward pivoting of the seat stay 18 about pivot 32, the rear axle 22 moves rearwardly relative to pivot 32.

The geometry is designed so that the locus of rear axle 22 approximates an arc centred on bottom bracket 21. Most preferably, the arc slightly increases in radius to offset the winding/unwinding effect.

Referring to FIG. 12 there are illustrated three different geometries.

In FIG. 12A the main pivot 24 is located above and forward of the bottom bracket 21 and the link 30 defines a significantly obtuse angle with seat stay 18. This geometry displays a negative N-factor as the chain and traction force will push the rear axle 22 forward thereby closing the angle between the link 30 and chain stay 18 to approximately 90 degrees and compressing the suspension. It will be appreciated that if the angle between the link and sea. stay was significantly acute in the sag position, then the suspension would display a positive N-factor.

Referring now to FIG. 12B, there is shown a geometry in which the main pivot location 24 is again located above and forward of the bottom bracket 21. However, in this geometry the link 30 defines an angle of approximately 90 degrees with the chain stay 18 whilst in the sag position. Therefore, this geometry does not have the negative N-factor of the geometry of FIG. 12A. It should be noted that the angle need not be exactly 90 degrees. Rather, it simply needs to be close enough to 90 degrees to ameliorate the initial tendency of the angle between the link 30 and seat stay 18 to move towards 90 degrees in response to pedalling. Accordingly, as used herein the terms "approximately 90 degrees" and "substantially 90 degrees" are used to denote this situation in which the suspension does not compress or extend significantly in response to pedalling.

Referring to FIG. 12C, there is shown a further geometry in which the main pivot 24 has been moved to a location above the bottom bracket 21. The chain stay has been shortened and is now rearwardly inclined. The link 30 defines an angle of approximately 90 degrees with the seat stay 18. With this geometry the rear axle follows an approximate arc centred on the bottom bracket.

As can be seen from the above illustrations the P-factor of the design can be optimised by variations in geometry. Similarly, N-factor can be optimised by fine tuning of the height of the main pivot, for example.

The present invention provides an alternative suspension design in which both P-factor and N-factor can be simultaneously controlled by fine tuning of geometry.

It will of course be realised that whilst the above has been given by way of an illustrative example of this invention, all such and other modifications and variations hereto, as would be apparent to persons skilled in the art, are deemed to fall within the broad scope and ambit of this invention as is herein set forth.

I claim:

1. A rear suspension system for a bicycle comprising;

(a) a frame;

(b) a chain stay comprising a front end and a rear end, wherein said front end is pivotally mounted to said frame;

(c) a link member, wherein said link member is pivotally mounted to said frame; and (d) a seat stay, comprising an upper end, a lower end, and a pivot point, wherein said pivot point is located between said upper end and said lower end; said lower end is mounted to a rear axle, said upper end is pivotally mounted to said link member, and said rear end of said chain stay is pivotally mounted to said pivot point.

2. The rear suspension system, according to claim 1, wherein, said frame further comprises a bottom bracket, said distance between said bottom bracket and said rear axle remaining essentially constant, such that said rear axle follows an approximate arc centered on said bottom bracket.

3. The rear suspension system, according to claim 1, wherein said rear suspension system is adapted to be loaded with an article to be transported such that said link member and said seat stay define an angle of approximately 90 degrees when the rear suspension is loaded with said article.

* * * * *